UNITED STATES PATENT OFFICE.

DANIEL PARLOW, OF PHILADELPHIA, PENNSYLVANIA.

IMPROVEMENT IN MEDICAL COMPOUNDS OR BLOOD-PURIFIERS.

Specification forming part of Letters Patent No. 138,759, dated May 13, 1873; application filed April 9, 1873.

*To all whom it may concern:*

Be it known that I, DANIEL PARLOW, of the city and county of Philadelphia and State of Pennsylvania, have invented a certain Compound called "Blood-Purifier," to be used, as its name signifies, for the purification of the blood of the human system and the cure of diseases obstructing arterial and venous circulation.

The ingredients of my compound are as follows, to wit: One pound each of cinnamon bark, boneset, sassafras bark, wood-dittany, and May-apple root to two gallons of water.

The compound is prepared by boiling the above mixture down to one gallon, then emptying the same into a kettle, (covered or closed,) adding one gallon of sirup-molasses, and then drawing or boiling the same gently for four hours, skimming from time to time and keeping the vessel closed as much as possible, that the virtue of the herbs may not escape during the process. The compound is then strained thoroughly, and after an interval of three hours strained again, and the preparation is fit for use twenty-four hours thereafter.

I claim as my invention—

The composition or compound consisting of the ingredients named in the proportions hereinbefore specified, prepared substantially as described, for the purposes set forth.

DANIEL PARLOW.

Witnesses:
JOHN J. WARD,
ROBERT R. SMITH.